US012379832B2

(12) United States Patent
Gill et al.

(10) Patent No.: US 12,379,832 B2
(45) Date of Patent: *Aug. 5, 2025

(54) INTELLIGENT ZONING

(71) Applicant: Geotab Inc., Oakville (CA)

(72) Inventors: Muhammad Junaid Gill, Waterdown (CA); Abhilash Muduvathi, Toronto (CA); Daniel Jacob Lewis, Cambridge (CA); Terence Michael Branch, Oakville (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,592

(22) Filed: Feb. 5, 2024

(65) Prior Publication Data

US 2024/0176471 A1 May 30, 2024

Related U.S. Application Data

(63) Continuation of application No. 17/529,179, filed on Nov. 17, 2021, now Pat. No. 11,934,644.

(Continued)

(51) Int. Cl.
*G06F 16/00* (2019.01)
*G06F 3/04842* (2022.01)
(Continued)

(52) U.S. Cl.
CPC ........ *G06F 3/04842* (2013.01); *G06F 16/285* (2019.01); *G06F 16/29* (2019.01); *G06F 16/904* (2019.01); *G06F 18/231* (2023.01); *G06F 18/2321* (2023.01); *G06T 11/206* (2013.01); *G07C 5/008* (2013.01); *G07C 5/06* (2013.01); *G08G 1/13* (2013.01); *G08G 1/20* (2013.01)

(58) Field of Classification Search
CPC .... G06F 3/04842; G06F 16/285; G06F 16/29; G06F 16/904; G06F 18/231; G06F 18/2321; G06T 11/206; G07C 5/008; G07C 5/06; G08G 1/13; G08G 1/20; G08G 1/148; G08G 1/0129; G08G 1/0133; G08G 1/0141; G08G 1/0112
See application file for complete search history.

(56) References Cited

U.S. PATENT DOCUMENTS 6,737,989 B2  5/2004  Flick
7,043,365 B2  5/2006  Inbar et al.
(Continued)

FOREIGN PATENT DOCUMENTS

KR  10-2020-0098696 A  8/2020
NL  2016902 B1 * 12/2017

OTHER PUBLICATIONS

Extended European Search Report for European Application No. 21209648.1, dated Apr. 20, 2022.

*Primary Examiner* — Dinku W Gebresenbet
(74) *Attorney, Agent, or Firm* — Wolf, Greenfield & Sacks, P.C.

(57) ABSTRACT

Systems and methods for grouping telematics vehicle data in one or more zones are provided herein. Systems and methods for generating zones and providing vehicle information associated with the one or more zones are also provided. Systems and methods for parallelizing zone generation and addressing zones disposed adjacent a boundary of a geographical are also provided.

28 Claims, 10 Drawing Sheets

Related U.S. Application Data

(60) Provisional application No. 63/117,187, filed on Nov. 23, 2020, provisional application No. 63/117,298, filed on Nov. 23, 2020.

(51) Int. Cl.
*G06F 16/28* (2019.01)
*G06F 16/29* (2019.01)
*G06F 16/904* (2019.01)
*G06F 18/231* (2023.01)
*G06F 18/2321* (2023.01)
*G06T 11/20* (2006.01)
*G07C 5/00* (2006.01)
*G07C 5/06* (2006.01)
*G08G 1/00* (2006.01)
*G08G 1/13* (2006.01)

(56) References Cited

U.S. PATENT DOCUMENTS

| | | |
|---|---|---|
| 7,502,687 B2 | 3/2009 | Flick |
| 8,350,696 B2 | 1/2013 | McClellan et al. |
| 9,341,487 B2 | 5/2016 | Bonhomme |
| 9,842,120 B1 * | 12/2017 | Siris ................... H04W 4/029 |
| 11,934,644 B2 | 3/2024 | Gill et al. |
| 2013/0211699 A1 | 8/2013 | Scharmann et al. |
| 2015/0142485 A1 | 5/2015 | Kiyama et al. |
| 2015/0213055 A1 | 7/2015 | Ballegeer et al. |
| 2018/0121878 A1 * | 5/2018 | Bostick ............ G06Q 10/08355 |
| 2018/0137675 A1 * | 5/2018 | Kwant ................... G06T 17/05 |
| 2019/0325382 A1 * | 10/2019 | Koohi ................ G06Q 10/083 |
| 2020/0108843 A1 | 4/2020 | Hunt |
| 2020/0279491 A1 | 9/2020 | Elisha et al. |
| 2022/0164089 A1 | 5/2022 | Gill et al. |

* cited by examiner

INTELLIGENT ZONING

RELATED APPLICATIONS

This application is a continuation of U.S. application Ser. No. 17/529,179, filed on Nov. 17, 2021, which claims the benefit of priority under 35 U.S.C. § 119(e) of U.S. Provisional Application Ser. No. 63/117,298, filed on Nov. 23, 2020, and U.S. Provisional Application Ser. No. 63/117,187, filed on Nov. 23, 2020, the disclosures of which are herein incorporated by reference in their entirety.

FIELD

Disclosed embodiments are related to intelligent zone formation based on vehicle telematics data and related methods of use.

BACKGROUND

Vehicle location information, such as global positioning system (GPS) coordinates, is typically utilized to provide navigation services. Vehicles may include telemetry hardware devices that track GPS data during vehicle movement. Vehicles may include other devices and sensors that monitor various other vehicle systems and provide vehicle information such as acceleration, speed, fuel level, airbag status, and/or other parameters.

SUMMARY

In some embodiments, a method of generating zones with a telematics system includes obtaining telematics data from one or more telematics devices associated with one or more vehicles, the telematics data including GPS data associated with one or more trips taken by the one or more vehicles. The method also includes identifying stops in the telematics data, identifying a cluster of stops using a clustering algorithm, creating a polygon containing the cluster of stops, and outputting the polygon as a zone to a user.

In some embodiments, a telematics system includes at least one processor and at least one storage medium having encoded thereon executable instructions, that when executed by the at least one processor, cause the at least one processor to carry out a method. The method includes obtaining telematics data from one or more telematics devices associated with one or more vehicles, the telematics data including GPS data associated with one or more trips taken by the one or more vehicles. The method also includes identifying stops in the telematics data, identifying a cluster of stops using a clustering algorithm, creating a polygon containing the cluster of stops, and outputting the polygon as a zone to a user.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
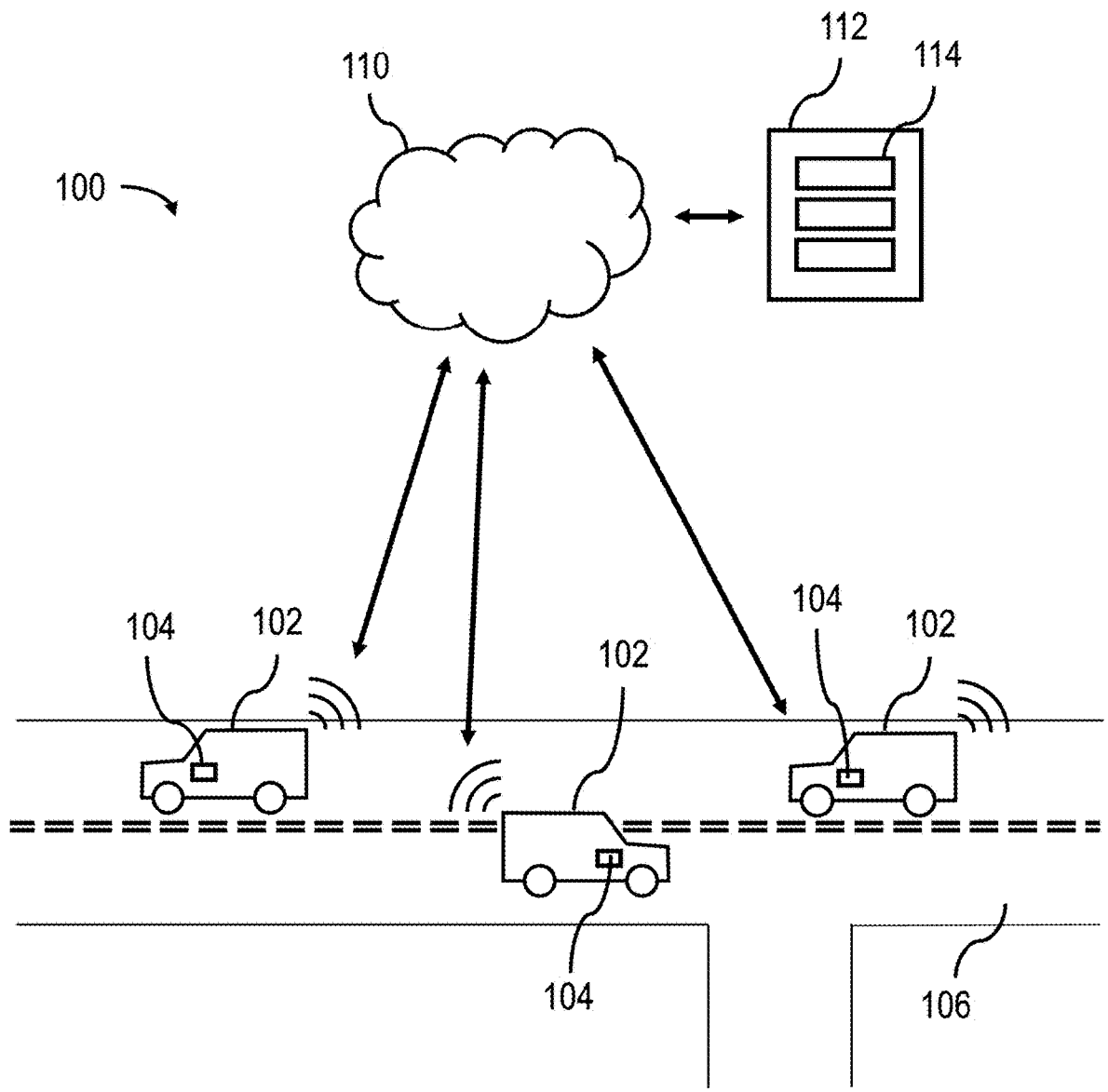
FIG. 1 is a schematic of one embodiment of a telematics system.

Conventional fleet management systems employ use of telematics for collecting vehicle data for fleet vehicles. Vehicle data may be transmitted from an onboard monitoring device to a remote subsystem, (e.g., server). Fleet management systems may be configurable to monitor and/or process vehicle data for providing fleet information to a fleet manager. In some cases, a fleet management system offers the ability for a user to create zones (e.g., geofences). A zone is a virtual perimeter or a virtual fence around a real-world area of interest. Zones may be used to identify landmarks that can be further used to categorize different areas of interest such as, an office, customer zone, supplier zone, yard zone, warehouse and home location. Creation of such zones is a manual activity. For example, a fleet management system may display an integrated map (e.g., a map that includes global position information, such as Open Street Maps (OSM)) on a user interface (e.g., a display). A fleet manager may manually identify an area of interest on the map and manually draws boundaries on the map to form an enclosed shape to define a zone. A fleet manager may use a user input device, such as a computer mouse, for example, to manually draw the zone on the map.

A fleet manager may create one or more zones for obtaining an understanding of fleet behavior within the zones. Dependent on the shape and location of each zone, the fleet management system may provide vehicle data corresponding to the zones. The fleet management system provides the fleet manager with information describing fleet activity within each zone. Regular monitoring of fleet activity within zones will aid in managing the fleet by the fleet manager. However, the inventors have appreciated that if a zone does not enclose an intended area of interest, information provided by the fleet management system regarding fleet activity within the intended zone will be inaccurate. Exemplary reasons a zone may not properly capture an intended area of interest includes human error, changes to road infrastructure and or parking areas post zone creation, among other reasons.

In view of the above, the inventors have appreciated the benefits of a telematics system and method configured to generate zones automatically based on recorded fleet data.

The generated zones may be provided to a user such as a fleet manager who may adopt the generated zones, update existing zones using the generated zones, or obtain zone information without manual creation or manipulation of zones. The telematics system and method may simplify the usage of the telematics system for a user, and/or may reduce the amount of input from the user to obtain actionable information from the recorded fleet data. The inventors have also appreciated the benefits of a telematics system configured to provide vehicle information based on the one or more zones generated by the telematics system. The vehicle information may be provided to a user such as a fleet manager to inform management decisions, for example.

In some embodiments, a telematics system may include at least one processor and at least one storage medium (e.g., non-transitory storage) having encoded thereon executable instructions, that when executed by the at least one processor, cause the at least one processor to carry out a method. In some embodiments, the at least one processor may be a component of a server or multiple servers. The at least one processor may be configured to receive telematics data from a plurality of telematics devices disposed on a plurality of vehicles. The telematics devices may transmit the telematics data to the at least one processor via one or more wired or wireless networks. The telematics data may be stored on the at least one storage medium. In some embodiments, at least one processor may be configured to provide the telematics data or one or more users. For example, the at least one processor may respond to a user request for the telematics data, or a portion thereof. The user may employ the telematics data to inform fleet management decisions. In some embodiments, the at least one processor may be configured to transmit telematics data or a portion thereof to one or more users. For example, the at least one processor may transmit information in a variety of formats in predetermined intervals to one or more users. In some embodiments, the at least one processor may be configured to execute a method of generating one or more zones based on the telematics data from the plurality of vehicles. The one or more zones may be generated based on a request received from a user (e.g., as user input) or may be generated automatically based on the telematics data. In some embodiments, the one or more zones may be generated based on a predetermined interval (e.g., daily, bi-weekly, weekly, bi-monthly, monthly, quarterly, semi-annually, annually, etc.). Exemplary methods that may be performed by at least one processor of a telematics system are described further below.

In some embodiments, a method of generating a zone with a telematics system includes obtaining telematics data from one or more telematics devices associated with one or more vehicles, the telematics data including GPS data associated with one or more trips taken by the one or more vehicles. In some embodiments, the telematics data may be obtained from a plurality of telematics devices each associated with a vehicle. The plurality of telematics devices may transmit the telematics data to at least one processor of the telematics system, for example, by way of one or more networks (e.g., local area network, wide area network, etc.) In some embodiments, the telematics data may be obtained from a storage medium. For example, the telematics data may be historical telematics data stored on the storage medium. The method may also include identifying stops in the telematics data. Stops may correspond to times when a vehicle associated with a telematics device is not moving. For example, stops may include, but are not limited to, idling, vehicle ignition off state, and being positioned off of a roadway. The method may also include identifying a cluster of stops using a clustering algorithm. For example, in some embodiments, a density based clustering algorithm such as DBSCAN may be employed to identify the cluster of stops. The method may also include creating a polygon containing the cluster of stops. For example, the polygon may be formed by the outermost stops within the identifying cluster. In some embodiments, the polygon may have a predetermined shape (e.g., rectangle, pentagon, hexagon, etc.). In such embodiments, the polygon may be sized to contain the stops of the identified cluster. In some embodiments, the method may also optionally include outputting the polygon as a zone to a user. For example, in some embodiments the polygon may be displayed on a base map to a user (e.g., on a graphical user interface of a display). In some embodiments, the method may include storing the polygon as a zone in a storage medium. The stored polygons may be later retrieved by a user (e.g., based on a user request) or sent to a user.

In some embodiments, a method of generating zones with a telematics system may include obtaining telematics data from one or more telematics devices associated with one or more vehicles, the telematics data including GPS data associated with one or more trips taken by the one or more vehicles, and identifying stops in the telematics data, as discussed above. The method may also include identifying a first cluster of stops using a clustering algorithm and creating a first polygon containing the first cluster of stops. The method may also include identifying a second cluster of stops using the clustering algorithm and creating a second polygon containing the second cluster of stops. In some embodiments, the first polygon and the second polygon may be output to a user as a first zone and a second zone, respectively. In some embodiments, a plurality of clusters may be identified by the clustering algorithm, and a corresponding polygon may be created. Accordingly, any suitable number of clusters and polygons may be created by methods according to exemplary embodiments described herein, as the present disclosure is not so limited.

The inventors have also appreciated that in some cases it may be beneficial to merge polygons (e.g., zone) if the polygons exceed one or more similarity thresholds. In some embodiments, if a first polygon and a second polygon are within a threshold distance of one another, the method may include merging the first polygon and second polygon into a merged polygon corresponding to a merged zone. The merged polygon may be output to a user as a merged zone (e.g., at a graphical user interface). In some embodiments, the threshold distance may be less than or equal to 100 m, 50 m, 25 m, 10 m, and/or any other suitable distance. In some embodiments, the threshold distance may be negative, such that the first polygon and second polygon are not merged unless the first polygon and second polygon overlap. In some such embodiments, the threshold distance may be less than or equal to −1 m, −5 m, −10 m, −25 m and/or any other appropriate distance. In some embodiments, a first and second polygon may be merged based on the presence of overlap in terms of percentage area (e.g., a threshold percentage of overlapping area between the first polygon and second polygon is exceeded). In such embodiments, the threshold percentage of overlapping area to merge multiple polygons may be greater than or equal to 1%, 5%, 15%, 20%, 25%, and/or any other suitable percentage.

The inventors have also appreciated that it may be desirable to provide a user vehicle information associated with one or more zones generated according to exemplary methods described herein. In some embodiments, the vehicle information may be provided to a user based on one or more parameters received by a user (e.g., as user input). The one or more parameters may be categories of vehicle information recorded by a telematics device and associated with a stop within an identified cluster. In some embodiments, the one or more one or more parameters include at least one selected from a group of dwell time (e.g., time the vehicle spent at the stop), number of entries into a zone, number of exits, entry points to the zone, exit points from the zone, and vehicle types. In some embodiments, a telematics system may provide the vehicle information to a user automatically (e.g., at a graphical user interface). Of course, any suitable vehicle information associated with one or more zones may be provided to a user on request or automatically, as the present disclosure is not so limited.

In addition to the above, the inventors have appreciated that a telematics data may be large, such that identifying stops and/or identifying one or more clusters of stops may be computationally difficult. For example, some fleets may include well over 100,000 vehicles which may make multiple stops daily. Accordingly, the number of stops stored in at least one storage medium may number in the millions or billions for some fleets, in addition to the other telematics vehicle information associated with vehicle trips. Accordingly, the inventors have appreciated the benefits of parallelizing performance of a method of generating zones according to exemplary embodiments herein for some telematics data sets. In particular, the inventors have appreciated that identifying stops based on more filter parameters input by a user may reduce the size of a data set and correspondingly decrease computational load. Additionally, the inventors have appreciated the benefits of identifying one or more clusters within multiple discrete geographical spaces and combining the geographical spaces following the cluster identification. By identifying one or more clusters within geographical spaces, the search space for a clustering algorithm may be reduced compared with applying a clustering algorithm to an entire data set. Such reduced search spaces may be employed to reduce computational difficulty. Accordingly, methods described herein employing such reduced search spaces may be applicable to many different fleet sizes that have correspondingly different data set sizes.

In some embodiments, stops in telematics data may be identified based on one or more filter parameters received from a user as user input. The one or more parameters may include at least one selected from a group of vehicle type (e.g., delivery vehicle, personal vehicle, light truck, tractor trailer, construction vehicle, etc.), time of day (e.g., 9 AM-5 PM, 5 PM-9 AM, etc.), month range (e.g., November to January, May to July, etc.), date range (e.g., Date 1 to Date 2, last 6 months, etc.), stop time (e.g., greater than 5 minutes, greater than 15 minutes, greater than 30 minutes, greater than 1 hour, etc.), and geography (e.g., country, region, state, county, city, warehouse, factory, store, etc.). Of course, any suitable filter parameters may be employed, as the present disclosure is not so limited. These one or more filter parameters may remove stops from a subsequent clustering identification process. Accordingly, a clustering algorithm may have less data points to process, thereby reducing computation load when compared with identifying clusters on an entire telematics data set.

In some embodiments, one or more filter parameters may be received from a user as user input, and the one or more filter parameters may be based on areas relevant to the user. That is, a user may select the one or more filter parameters such that one or more zones generated according to exemplary embodiments herein are relevant to problems faced by the user. For example, a fleet manager may be only interested in activity of the fleet from 9 AM-PM and may accordingly select this time of day as a filter. Accordingly, zone(s) generated based on this selected filter parameter will be based only on stops made in this time period, such that the generated zones are relevant to the interest of the user. In some embodiments, a user may select multiple filter parameters to further narrow the generated zones to the relevant interests of the user. For example, a fleet manager may be only interested in tractor trailer stops during a delivery window of 12 PM-5 PM. According to this example, the fleet manager may input tractor trailer as a vehicle type filter parameter and a time-of-day filter parameter matching the desired time window. The zones generated based on these selected filter parameters will be relevant to the fleet manager's interest areas. In this manner, one or more filter parameters may be combined in any order and number so that a user may generate relevant zones of interest. As discussed above, the selection of filter parameters may also have the added benefit of reducing a search space for a clustering algorithm.

In some embodiments, identifying a cluster of stops includes assigning a geographical space having a geographical boundary for the clustering algorithm. Assigning the geographical space may exclude stops that are disposed outside of the geographical boundary. Accordingly, a clustering algorithm may identify the cluster based only on the stops within the geographical space, thus reducing the computational load of identifying clusters across an entire telematics data set. In some embodiments, the geographical boundary may be based on one or more geopolitical boundaries. For example, in some embodiments, a geographical boundary includes at least one selected from a group of a national border, a county border, and a postal code border. For example, in an embodiments where telematics data includes stops disposed in a first country and a second country, the geographical boundary may be a national border. According to this example, one or more clusters within the first country may be identified, and one or more clusters within the second country may be identified. In some embodiments, this identification in each country may occur in parallel, such that the speed at which clusters are identified in both countries is accelerated. Similarly, in another example, telematics data may include stops disposed in a first state and a second state, and the geographical boundary may be a state border. According to this example, one or more clusters within the first state may be identified, and one or more clusters within the second state may be identified separately (e.g., in parallel). Of course, any suitable geographic space and geographical boundary may be employed, as the present disclosure is not so limited.

According to some exemplary embodiments described herein, cluster identification may be based on an assigned geographical boundary, where the geographical boundary excludes stops disposed outside of a geographical space. In some cases, there may be a plurality of stops that would otherwise form a cluster disposed on opposite sides of the geographical boundary. As the geographical boundary splits the plurality of stops, a cluster formed within the geographical boundary, if identified, may not be representative of an appropriately sized zone. Accordingly, the inventors have appreciated a method to capture zones disposed near a geographical boundary imposed during cluster identification. In some embodiments, the method may include establishing a buffer extending a predetermined distance around the geographical boundary. In some embodiments, the predetermined distance may be between 50 m and 200 m, 75 m and 125 m, 100 m and 500 m, and/or any other appropriate distance. The method may also include identifying stops within the buffer and identifying a buffer cluster of stops within the buffer using the clustering algorithm. Accordingly, in this manner, the buffer around the geographical boundary may effectively function as a separate geographical space and clusters within the buffer are identified. The method may also include creating a buffer polygon containing the identified cluster of stops within the buffer. In some embodiments, the buffer polygon may be output to a user as a zone. In some embodiments, the method may include determining whether the buffer polygon overlaps with any polygons in the geographical space(s) having the geographical boundary. Based on the determination of whether the buffer polygon overlaps with any other polygons, the buffer polygon may be merged with the overlapping polygon(s). The merged polygon may be output to a user as a merged zone. In this manner, a telematics system and method according to exemplary embodiments herein may identifying clusters within multiple geographical spaces in parallel, and capture zones disposed on or near boundaries of the geographical spaces.

It should be noted that the above methods for reducing computational load to identify one or more clusters of stops from telematics data may be employed alone or in combination. For example, in some embodiments one or more filter parameters may be employed to reduce the number of identified stops within a telematics data set in combination with employing assigned geographical spaces to identify clusters of stops in parallel. In other embodiments, one or more filter parameters may be employed without the use of geographical spaces. For example, if the total number of identified stops based on one or more filter parameters is below a threshold number of stops (e.g., less than 10,000, less than 1,000, etc.), no geographical spaces may be assigned. In other embodiments, a geographical space may be assigned with no filter parameters. Of course, in still other embodiments, stops and clusters of an entire telematics data set may be identified with no filter parameters or assigned geographical spaces, as the present disclosure is not so limited.

The inventors have also appreciated the benefits of a telematics system that may automatically update zones or suggest updated zones for a user. In some cases, fleet deployments, delivery or pickup locations, fueling locations, rest stops, and/or road networks may change or be redeveloped. For example, a particular location associated with stops may close completely, may have a parking area reorganized or enlarged, or may move (e.g., loading zones moved to an opposite side of a building). Accordingly, existing zones may not capture new stops that fall outside of the existing zone due to these changes. In some embodiments, one or more polygons associated with one or more zones may be updated (e.g., at a predetermined interval or on user request). In some embodiments, updating one or more zones includes performing a method of generating zones according to exemplary embodiments described herein. For example, the method of generating zones may include identifying stops in telematics data, identifying a cluster of stops using a clustering algorithm, and creating a polygon containing the cluster of stops. The created polygon may be compared with an existing polygon corresponding to an existing zone. In some embodiments, if the change in area of the existing zone compared to the newly generated zone is greater than a modification threshold, the existing polygon may be merged with the newly created polygon to form an updated polygon corresponding to an updated zone. For example, if the difference in area between the existing polygon and the newly created polygon is greater than or equal to 15%, 20%, 25%, 30%, or another suitable percentage, the existing polygon and newly created polygon may be merged. In some embodiments, if the change in area of the existing zone compared to the newly generated zone is greater than a modification threshold, the existing polygon may be replaced by the newly created polygon. The existing polygon would then be deleted, and the newly created polygon would be used until the next update.

According to exemplary embodiments described herein, a telematics device may be configured to obtain information from one or more onboard sensors and/or one or more sensors or a vehicle control system of a vehicle. In some embodiments, a telematics device may communicate with a vehicle's OBD II port for gathering vehicle operation information therefrom, and may include other sensors/detectors, such as a GPS tracker, for detecting a vehicle's GPS location. Specific and non-limiting examples of vehicle data that may be obtained by a telematics device and transmitted to at least one processor includes onboard monitoring device ID data, position data (e.g., GPS position data), vehicle speed data, ignition state data, (e.g., whether vehicle ignition is ON or OFF), and date and time data indicative of a date and time vehicle operating conditions were logged by the telematics device.

According to exemplary embodiments described herein, an onboard telematics device intermittently transmits vehicle data over a network which is received and stored by, for example, a remote server for future analysis of a single vehicle or fleet performance. A single fleet may comprise any number of vehicles each of which may include a telematics monitoring device. For instance, a fleet may include 100,000 vehicles. In this example, large volumes of vehicle data (e.g., terabytes, petabytes, exabytes, etc.) may be transmitted to, and stored by, the remote server. Of course, methods and systems according to exemplary embodiments described herein may be employed with a fleet of any size, as the present disclosure is not so limited. For example, a fleet may include between 1 and 100 vehicles, 100 and 500 vehicles, 500 and 1000 vehicles, 1000 and 10,000 vehicles, greater than 50,000 vehicles, and/or any other number of vehicles.

According to exemplary embodiments described herein, a user may receive information and/or outputs from a telematics system using any suitable arrangement. In some embodiments, a user may receive information and/or outputs from the telematics system via the internet or one or more wide area networks. For example, the telematics system may include at least one processor of at least one remote server, which may transmit information over the internet to a user. The user may access the information and/or outputs via a web portal, application programming interface (API), data stream, remote connection, or any other suitable arrangement. In some embodiments, the user may receive the information and/or outputs at a graphical user interface of a device such as a smartphone, personal computer, tablet, or other device. In some embodiments, a user may send inputs to the telematics system via the internet or one or more wide area networks. For example, the telematics system may include at least one processor of at least one remote server, which may receive information over the internet from a user. The user may submit the user input via a web portal, application programming interface (API), data stream, remote connection, or any other suitable arrangement. In some embodiments, the user may send the user input at a graphical user interface of a device such as a smartphone, personal computer, tablet, or other device.

It should be noted that while exemplary embodiments described herein are described with reference to one or at least one processor, any suitable number of processors may be employed. For example, the at least one processor may be a plurality of processors of a plurality of remote services. Likewise, it should be noted that while exemplary embodiments described herein are described with reference to one or at least one storage medium, any suitable number of storage mediums may be employed, including a plurality of storage mediums. In some embodiments, a storage medium may be a non-transitory storage medium.

While in some embodiments described here a density based clustering algorithm (e.g., DBSCAN) is employed, any suitable clustering algorithm may be employed, as the present disclosure is not so limited. In some embodiments, a clustering algorithm may be one selected from a group of k-means, affinity propagation, mean shift, spectral clustering, and agglomerative clustering.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of a telematics system 100 for performing various processes described herein. The telematics system 100 is configured to receive information from multiple vehicles 102 such as vehicles 102 disposed on a road 106. Each vehicle 102 may be associated with a telematics device 104 (e.g., vehicle 102 is associated with telematics device 104). As used herein, the term "telematics device" may refer to any device configured to monitor operation of a vehicle to which it is connected and to communicate data to a remote site. It should be appreciated that the term "telematics device" may refer to a device that is removably installed in and/or integral to a vehicle, as the present disclosure is not limited in this regard.

Each telematics device 104 is configured to collect (or otherwise receive) telematics data and to transmit the telematics data through a communication network 110 to one or more destinations. Such destinations may include a server 112 including at least one processor. As used herein, the term "telematics data" may refer to any data collected, received, analyzed, processed, communicated, or transmitted by a telematics device. While for case of illustration, one server 112 is shown, it should be appreciated that server 112 may be implemented as one or more servers, including a distributed system of servers that operate together, such as a cloud service. Such server(s) 112 may be implemented as any suitable form of computing hardware, as embodiments are not limited in this respect. The server 112 may include software such as a zone generation facility 114 that carries out the techniques described herein. It should be appreciated that a zone generation facility need not be associated with a server, but rather that a zone generation facility may be executed on any suitable hardware, as the present disclosure is not limited in this respect.

Transmission by the telematics devices 104 via the network(s) 110 may include any suitable transmission technique, including communication to a satellite, through a ground-based station, over a cellular network, over a computer network, over the Internet, and/or using any other suitable channel. Accordingly, network(s) 110 may include any suitable one or combination of wired and/or wireless, local- and/or wide-area communication networks, including one or more private or enterprise networks and/or the Internet. In some embodiments, the telematics devices 104 may transmit data using a wireless connection to a wireless wide area network (WWAN) such as a cellular network, after which it may be transmitted via one or more other networks (e.g., wired networks) to a destination such as a server 112. In some embodiments, a telematics device 104 streams data (e.g., contemporaneously with the data being generated and/or received by the telematics device 104, or in real time) to the server 112 via the network(s) 110.

The telematics devices 104 of FIG. 1 may include suitable hardware and/or software configured to collect, sense, receive, process, store, and/or transmit any appropriate telematics data associated with a vehicle. A telematics device 104 may be integrated into the vehicle or may be removably connected to a vehicle, such as through a diagnostic port (e.g., an on-board diagnostics (OBD) or OBD-II port). In some embodiments, telematics device 104 may include a hand-held device, which may include a mobile device such as a cellular telephone or smartphone. The telematics device 104 may communicate with one or more components of the vehicle 102 or otherwise receive from the vehicle 102 telematics data related to the vehicle 102. The telematics device 104 may be configured to connect to a vehicle through an OBD II port or a CAN bus port, or may be integrated into a vehicle's central control system. The telematics device 104 may then transmit the telematics data from the device 104 and vehicle 102, to a destination remote from the vehicle 102. It should be appreciated that the term "telematics device" may refer to hardware and/or software, as the present disclosure is not limited in this regard.

In some embodiments, vehicle 102 may be configured to collect and transmit information collected by sensors disposed in the vehicles 102 or otherwise collected by or relating to components of the vehicles 102, such as through telematics devices 104 installed in the vehicles 102. The information collected and transmitted may include telematics data for the vehicle. The telematics data collected (e.g., received) by telematics devices in a number of vehicles may be transmitted to a remote site for analysis, such as by processes running on one or more servers. The telematics data that is collected, transmitted, and analyzed may include data generated by a number of different sensors of a vehicle, such as ignition sensors, ambient temperature sensors, fuel sensors, speed sensors, and so on.

In some embodiments, vehicles 102 may transmit telematics data, which may include location data (e.g., GPS data) and/or time data. The telematics data may be analyzed to identify locations and/or times where a vehicle was stopped. As such, stops included in telematics data may be associated with a zone of related stops. As also described above, telematics data may include other information in addition to location and/or time data (e.g., ignition data regarding an off or on state of a vehicle). Such telematics data may be collected from many different vehicles. Over time, a large quantity of data may be collected from many different vehicles.

As used herein, telematics data may include data relating to a vehicle 102 or operation of the vehicle. Telematics data may be associated with a telematics device 104 that is installed in or integrated with a vehicle 102. The telematics device 104 may receive and/or transmit the telematics data. While telematics data may be associated with a telematics device 104 connected to a vehicle 102, telematics data may additionally or alternatively be associated with one or more other devices. For example, telematics data relating to a vehicle or operation of a vehicle may be collected, received, and/or transmitted using an application on a smartphone. For example, telematics data related to vehicle location may be associated with location information from a smartphone. As another example, acceleration of a vehicle may be ascertained using data from one or more accelerometers of a smartphone.

In some embodiments, a stop may represent a period of time in which the vehicle is not moving. In some embodiments, a predetermined configurable time period of idling (e.g., 20 seconds or any other configurable time period) may be allowed for and not considered as a stop. Such an arrangement may eliminate traffic or other road conditions as qualifying as a stop. In some embodiments, an ignition off may indicate a stop.

Figure 2:
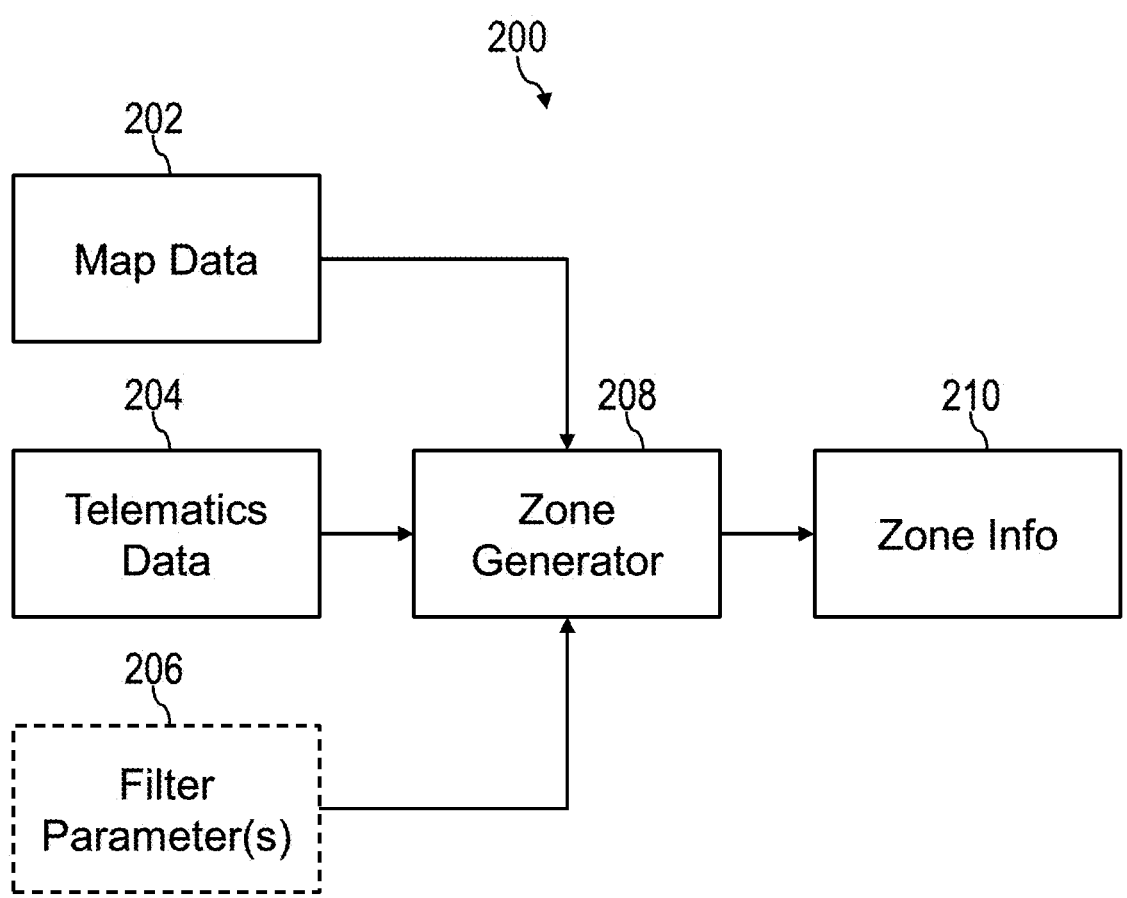
FIG. 2 depicts a block diagram of one embodiment of a system for generating zones and zone information.

FIG. 2 depicts a block diagram of one embodiment of a telematics system 200 for generating zones and zone information. One or more components may be, for example, executed as software by at least one processor. As shown in FIG. 2, the system 200 may include a zone generator 208 that generates zones for vehicle stops based on inputs. In particular, the zone generator generates zones based at least partly on map data 202 obtained from one or more map information providers (e.g., Open Street Maps). The map data 202 may include geographic information of a road network associated with a city, a county, and/or a country, as well as geographical boundaries. The zone generator may also generate zones based on telematics data 204. The telematics data may include stop information of one or more vehicles, as well as other information related to the one or more vehicles. Optionally, the zone generator may operate based on input of filter parameter(s) 206. The filter parameters may be received as input by a user and may be employed to filter out various stops from being associated with a zone. For example, a filter parameter may include vehicle type, such that only stops associated with a particular type of vehicle (or multiple types) is employed by the zone generator 208. As shown in FIG. 2, based on the zones output by the zone generator 208, zone information 210 associated with the zones may be provided to a user. The zone information may include telematics data related to identified stops within the zones output by the zone generator 208. The methods described herein may be implemented by the system of FIG. 2, in some embodiments.

Figure 3:
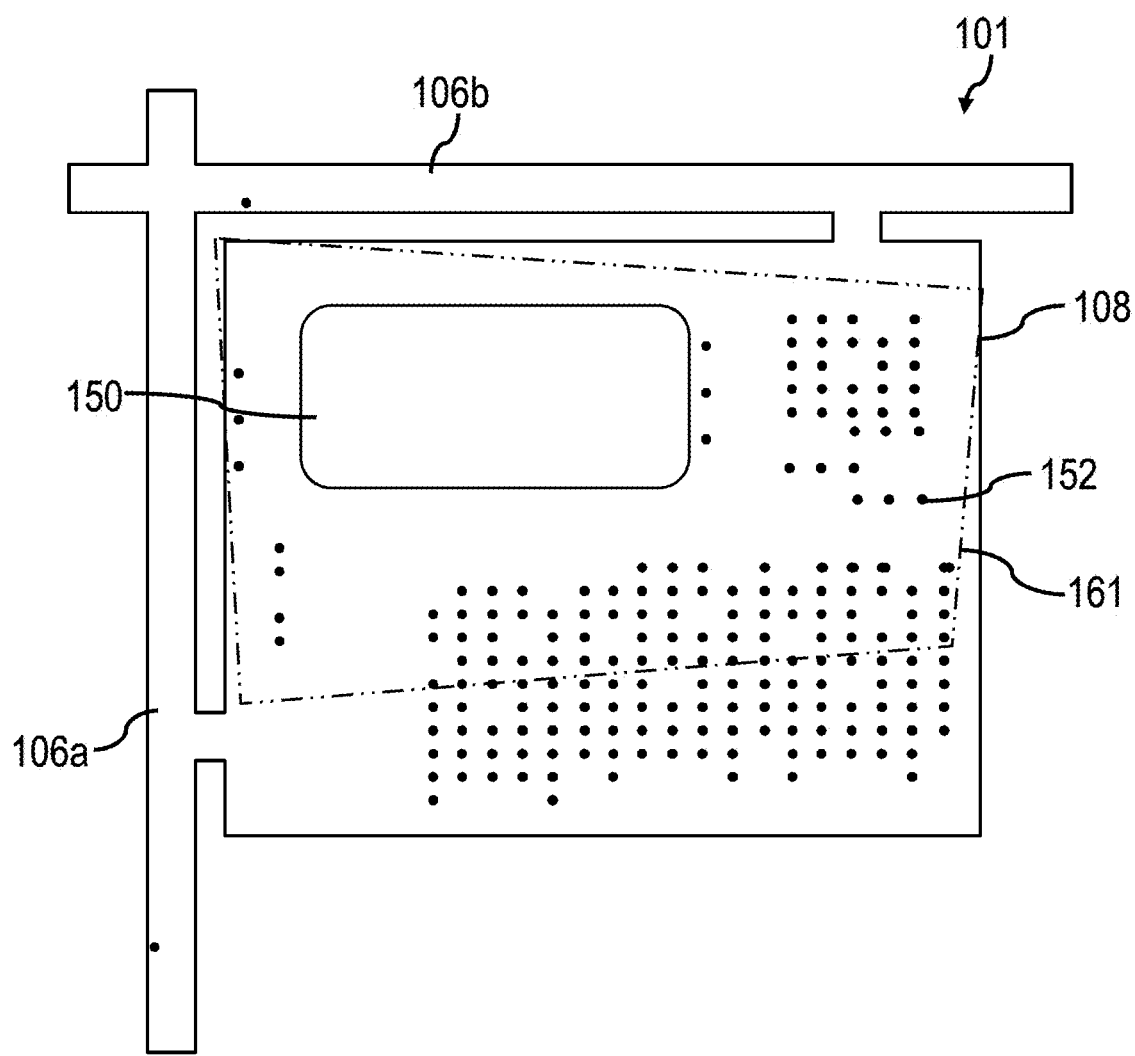
FIG. 3 is a schematic of one embodiment of telematics data employed to generate zones.

FIG. 3 is a schematic of one embodiment of telematics data employed to generate zones. FIG. 3 is representative of a map 101 depicting a geographical location with telematics data overlaid the map. In particular, FIG. 3 depicts a geographical location with vehicle stops 152 show by dots. As shown in the FIG. 3, the map includes a first road 106a and a second road 106b. The map also includes a parking lot 108 associated with a distribution building 150. The distribution building may be a warehouse, factory, or another building that is an origin or destination for vehicles within a fleet. Each dot in FIG. 3 represents a vehicle stop 152. As shown in FIG. 3, the vehicle stops may be spread across the various areas of the map, including the first road 106a, second road 106b, and the parking lot 108. The stops may be collected over time from a plurality of vehicles. The stops may be included as a part of telematics data sent to a remote server including at least one processor by a telematics device associated with each vehicle. In some embodiments, the view shown in FIG. 3 may be representative of a display or a portion of a display on a graphical user interface In some embodiments as discussed above, the stops 152 may be filtered based on one or more filter parameters. The one or more filter parameters may be based on user input. For example, a filter parameter may be a vehicle type. Accordingly, the stops 152 shown in FIG. 3 may all be associated with the selected vehicle type, and no other vehicle types. As another example, a filter parameter may be time of day. Accordingly, the stops 152 shown in FIG. 3 may have all occurred within the selected time of day. In some embodiments, multiple filter parameters may be employed to filter stops. For example, both vehicle type and time of day may be employed to filter stop displayed on the map 101. Of course, any suitable parameters may be employed to filter stops, including vehicle type, time of day, month range, date range, stop time, and geography, as the present disclosure is not so limited.

According to the embodiment of FIG. 3, the map 101 may include a user created zone 161. In this example, the fleet manager is interested in fleet activity within the parking lot 108 associated with the building 150. For example, the fleet manager may like to know the average amount of time a fleet vehicle waits in the parking lot 108 when making a delivery to the building 150. Accordingly, the user may employ provide user input (e.g., at a graphical user interface of a fleet management system) and draw boundaries on the map 101 to create the zone 161, as shown. However, as shown in FIG. 3, such user created zone 161 may not reflect the identified stops collected from vehicles. Accordingly, the user defined zone 161 does not capture many of the vehicle stops 152 that are still disposed in the parking lot 108 of the building 150. Once the zone 161 has been created by the user, the fleet management system may provide fleet activity information within that zone on a regular basis to the fleet manager for monitoring fleet activity in that zone. However, in the present example, fleet activity information based on the shape and location of zone 161 provided by the fleet management system will not accurately reflect fleet activity in the intended area of interest, namely parking lot 108. Since the fleet manager receives incorrect information regarding fleet activity in zone 161, proper management of the fleet may be impeded.

Figure 4:
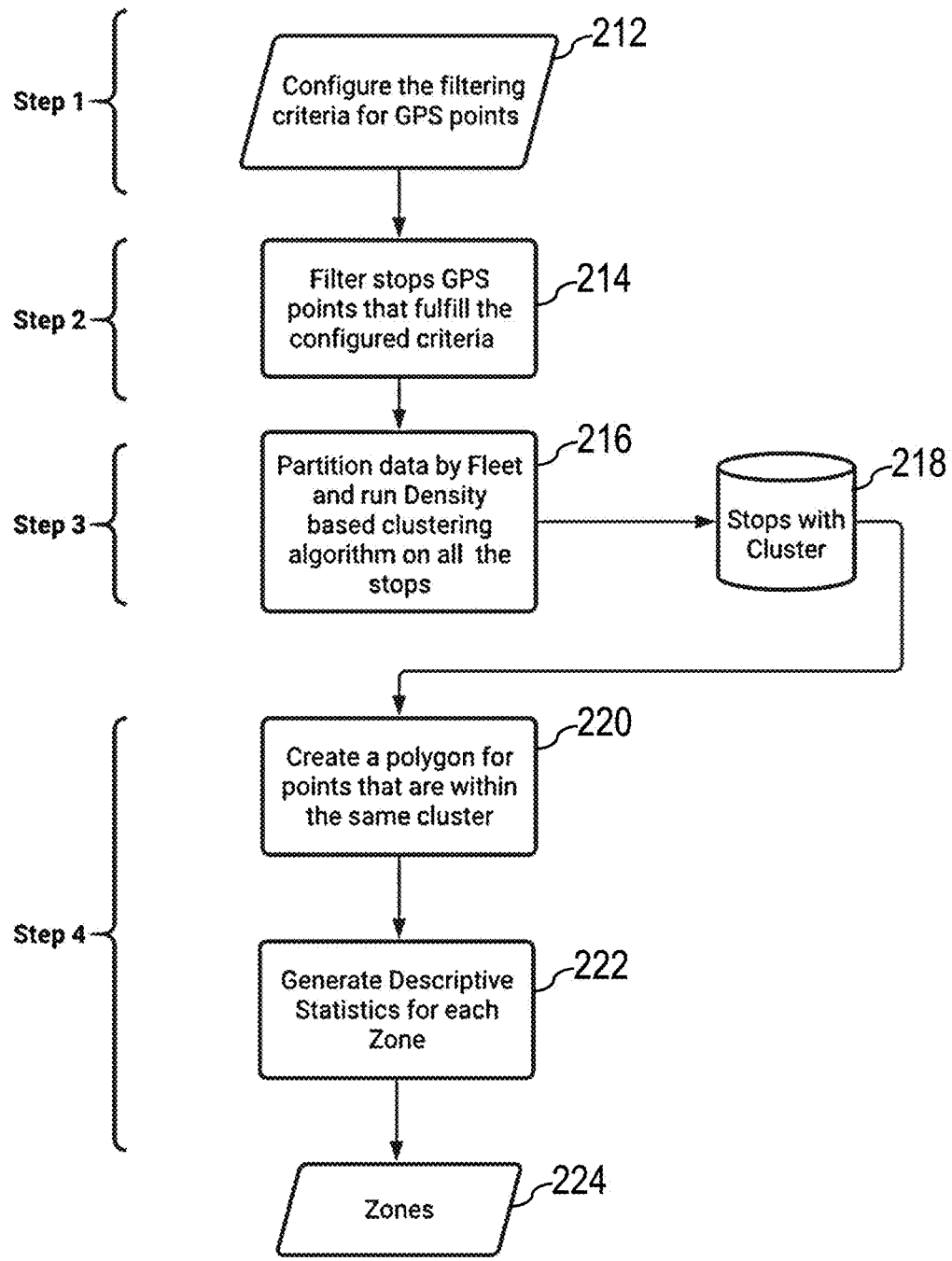
FIG. 4 depicts one embodiment of a method for generating zones.

FIG. 4 depicts one embodiment of a method for generating zones automatically based on telematics data associated with vehicles, and in particular generating zones based on recorded vehicle stops. In block 212, a first step may include configuring one or more filters for filtering vehicle data by a fleet management system for automatically creating one or more zones. Specific and non-limiting examples of configurable filters include vehicle type, date range, time of day, and stop duration. The vehicle type specifies the type of fleet vehicle for consideration. For example, a vehicle type of heavy-duty truck may be selected, since passenger cars in a fleet may not make deliveries. The date range specifies the date range of stops for consideration. For example, only stops made in the last six months may be included. Time of day specifies a window of time during the day for consideration. For example, fleet activity at all times of the day may be selected (e.g., between 00:00-23:59). As an alternative example, fleet activity at a limited time of the day such as between 09:00-17:00 may be selected. The stop duration specifies a minimum length of time a vehicle must be stopped to be considered a stop. For example, the stop duration filter may be set to a minimum stop duration of 5 min (300 sec). In this example, any stop less than 5 min by a fleet vehicle will be ignored by the fleet for the purposes of zone generation.

According to the method of FIG. 4, in block 214, a second step may include filtering GPS points corresponding to stops according to the filter configuration set in block 212. Filtering the GPS points in step 2 may include identifying a plurality of stops that meet the filter parameters established in block 212. In block 216, a third step includes implementing a clustering technique for clustering the stops identified in block 214. In other words, in block 216 high density regions of stops are identified as one or more clusters. As discussed previously, any suitable clustering algorithm may be employed to identify the one or more clusters. For example, a Density Based Spatial Clustering technique may be employed for clustering stops and filtering out noisy points (e.g., outliers). In some embodiment, such a technique utilizes pairwise distance between stops for determining stop density. The third step may also include removing, outlier stops that do not fall into a cluster in order to provide a most accurate shape and location of a zone/zones that are ultimately generated based on the identified one or more clusters. As shown in block 218, stops associated with clusters may be stored (e.g., on a non-transitory storage medium) for later usec.

As shown in FIG. 4, in block 220 a fourth step includes creating a polygon for stops that are within the same cluster identified in step 3 as described above. In some embodiments, forming a polygon includes forming a convex hull around each cluster of stops. The polygon may ultimately determine a zone, and in this sense the polygon is a representation of a generated zone. In block 222, vehicle data corresponding to stops (e.g., locations) within a zone may be processed to provide one or more of the following descriptive statistics for each zone. Some examples of descriptive statistics include stop count in the conferred time period, distinct vehicle count in the configured time period, stop distribution by month, average stop duration, 15 percentile stop duration, 50 percentile stop duration, 85 percentile stop duration, average driving duration before stopping in the zone, and average idling time in the zone. The metrics may assist a user such as a fleet manager in developing some context around the newly generated zone(s). In block 224, the zones and associated information may be output to a user (e.g., at a graphical user interface). FIGS. 5A-8D are described further below which depict several examples of implementations of methods according to exemplary embodiments described herein, including the method of FIG. 4.

Figure 5A:
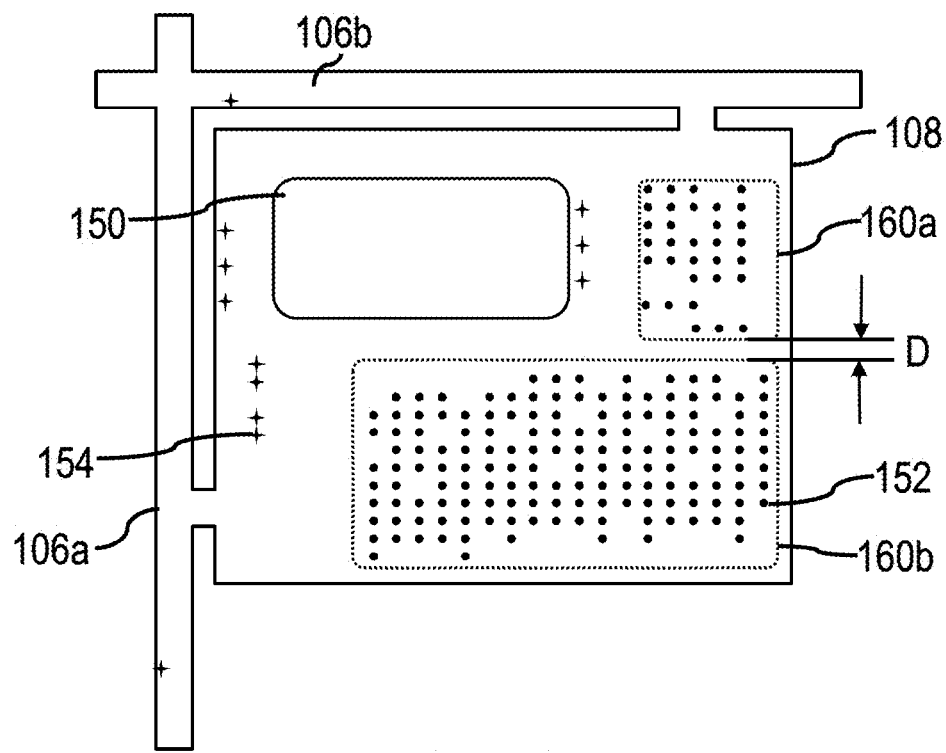
FIGS. 5A-5B depict steps of one embodiment of a method of generating zones employing the telematics data of FIG. 3.
Figure 5B:
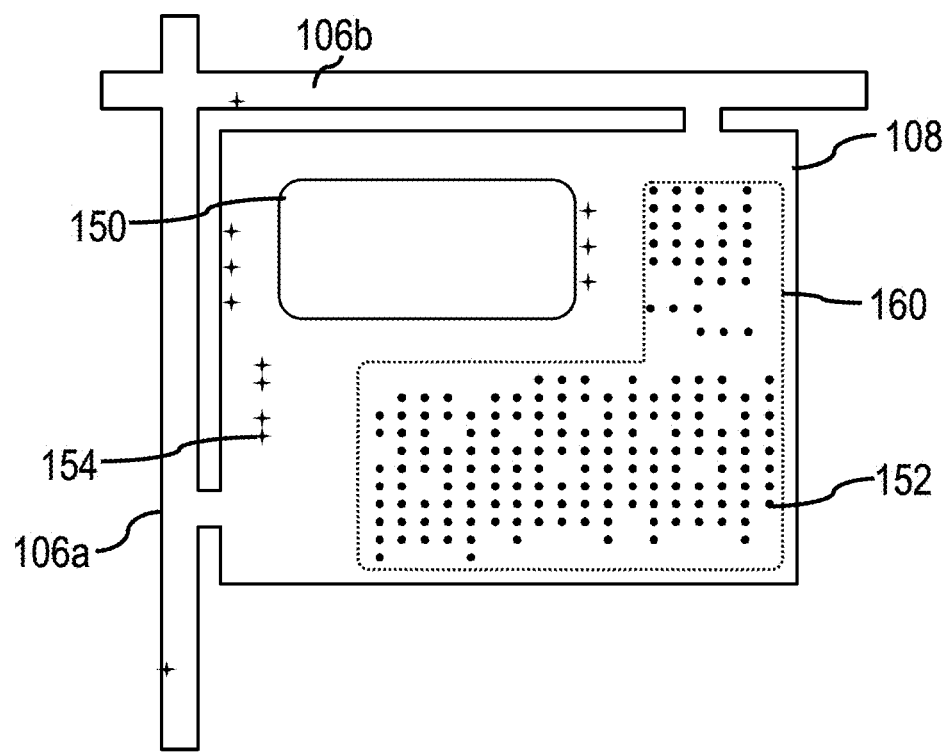

FIGS. 5A-5B depict steps of one embodiment of a method of generating zones employing the telematics data of FIG. 3. As show in FIG. 5A, method according to that of FIG. 4 has been performed on the vehicle stops 152. As a result, a first polygon 160*a* corresponding to a first zone and a second polygon 160*b* are generated based on two clusters of vehicle stops identified in the parking lot 108. Vehicle stops which do not correspond to either of the two polygons are discarded, shown by the stars 154. As shown in FIG. 5A, the starts are located in positions that do not correspond to the dense clusters defining the first polygon 160*a* and the second polygon 160*b*. For example, some of the outliers are disposed on the roads 106*a*, 106*b*, or more adjacent the building 150. According to the embodiment of FIGS. 5A-5B, the first polygon 160*a* and second polygon 160*b* may contain each stop associated with a cluster.

According to the embodiment of FIG. 5A, a clustering algorithm generated two discrete polygons 160*a*, 160*b*. However, the inventors have appreciated that zones within a predetermined distance from one another, or overlapping zones, may represent a singular zone encompassing an area like a parking lot with a geometry that creates adjacent clusters. Accordingly, in some embodiments, a first polygon 160*a* and a second polygon 160*b* may be merged with one another if certain conditions are met. In the embodiment of FIGS. 5A-5B, if a distance D between the first polygon 160*a* and second polygon 160*b* is below a threshold distance, the first polygon and second polygon are merged. For example, in some embodiments, if the distance D is less than 25 m, the first polygon and second polygon may be merged. Of course, any suitable threshold distance may be employed, as the present disclosure is not so limited. FIG. 5B depicts the results of a merged polygon 160 encompassing both the first polygon and second polygon of FIG. 5A.

Figure 6A:
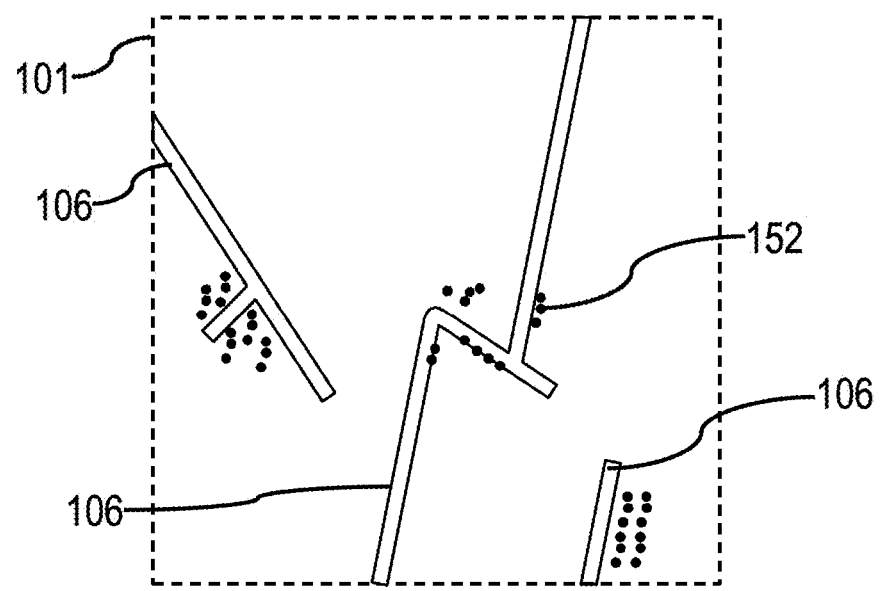
FIGS. 6A-6B depict steps of another embodiment of a method of generating zones.
Figure 6B:
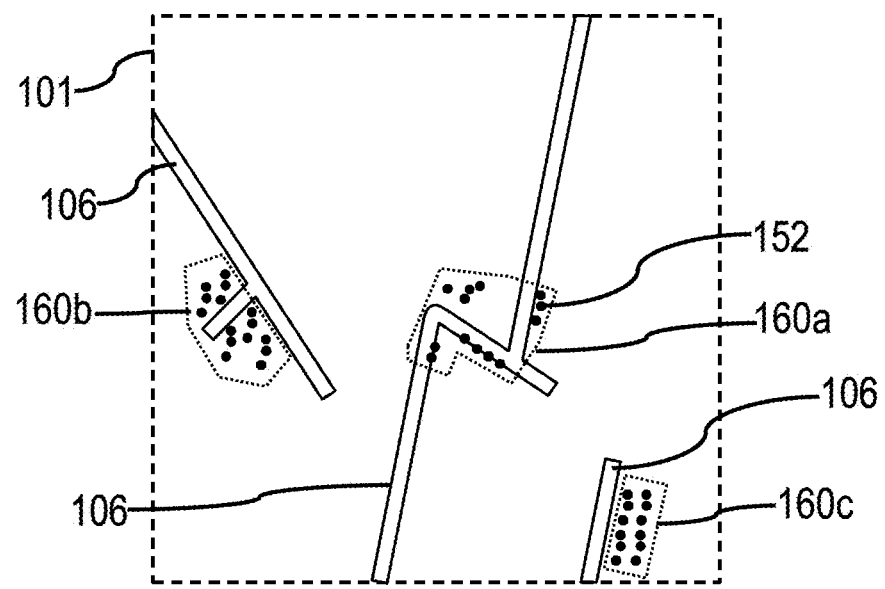

FIGS. 6A-6B depict steps of another embodiment of a method of generating zones. According to the embodiment of FIGS. 6A-6B, a regional map 101 is shown including a plurality of roadways 106. The display shown in FIGS. 6A-6B may correspond to that shown on a graphical user interface to a user. As shown by the dots overlaid on the map 101, vehicle stops 152 are identified from telematics data. A method of generating zones (e.g., as discussed with reference to FIG. 4), may be employed that applies a clustering algorithm to the vehicle stops 152. Once one or more clusters are identified, polygons corresponding to zones may be generated and output to a user. FIG. 6B depicts the result of such a method. As shown in FIG. 6B, three polygons 160*a*, 160*b*, 160*c* were generated corresponding to three zones. Accordingly, methods and systems herein may generate multiple zones across an entire geographical region and provide those zones to a user such as a fleet manager. Vehicle information associated with each zone may also be provided to the user.

Figure 7A:
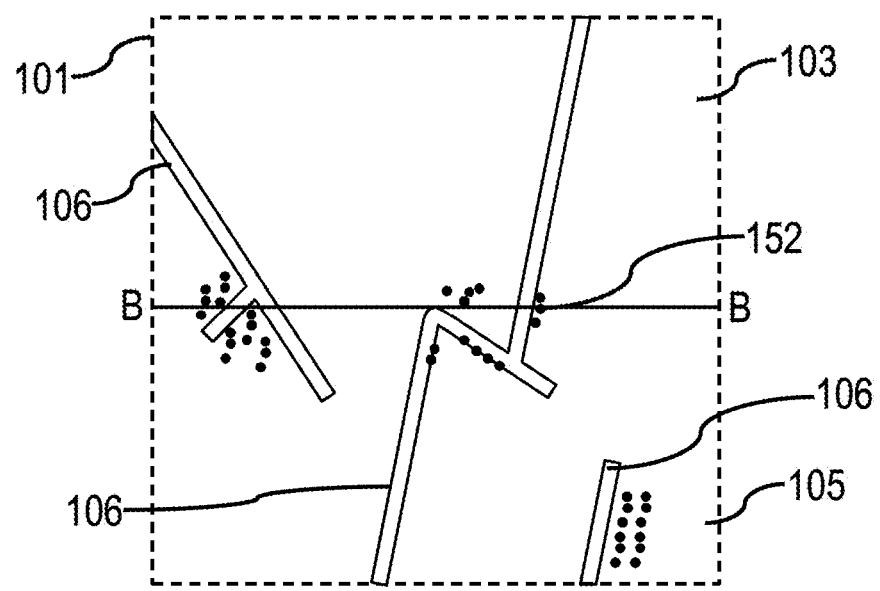
FIGS. 7A-7B depict steps of another embodiment of a method of generating zones.
Figure 7B:
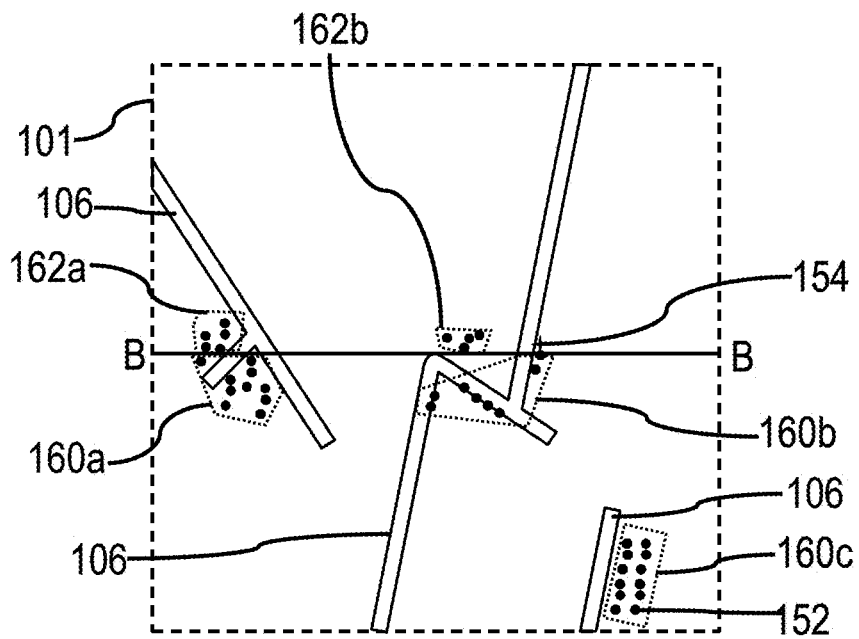

FIGS. 7A-7B depict steps of another embodiment of a method of generating zones. As discussed previously, in some embodiments a clustering algorithm may be applied to vehicle stops disposed in a geographical space including a geographical boundary. Such an arrangement may allow multiple clustering algorithms one multiple geographical spaces to be executed in parallel. Accordingly, clustering algorithms may be applied to adjacent geographical spaces separately, and resulting zones may be separated by geographical boundaries, which is shown in the exemplary embodiment of FIGS. 7A-7B. As shown in FIG. 7A, a geographical boundary B divides the vehicle stops 152, which are disposed on either side of the boundary. A clustering algorithm may be performed separately on vehicle stops on either side of the boundary. Accordingly, as shown in FIG. 7B, the resulting polygons will be different than those output in the embodiment of FIG. 6B, for example. In particular, three polygons 160*a*, 160*b*, 160*c* are generated that are associated with the lower geographical space, and two polygons 162*a*, 162*b* are generated that are associated with an upper geographical space 103. A first polygon 160*a* of the lower geographical space 105 would be combined with a first polygon 162*a* of the upper geographical region if the boundary limitation was not present. Accordingly, in some embodiments a method may compensate for this divided zone result, as will be discussed with reference to FIGS. 8A-8D.

Figure 8A:
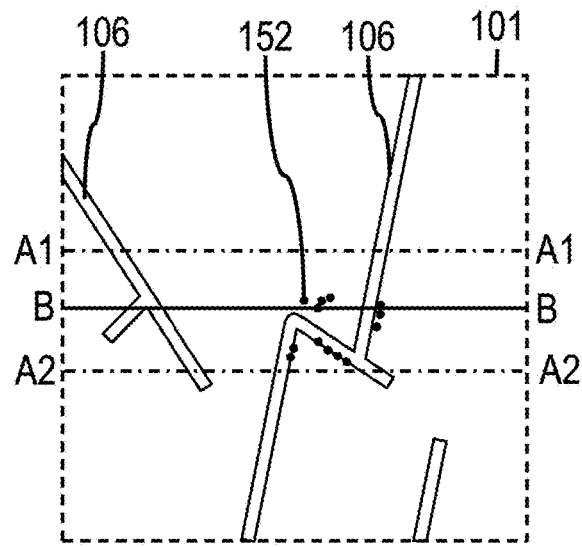
FIGS. 8A-8D depict steps of another embodiment of a method of generating zones.
Figure 8B:
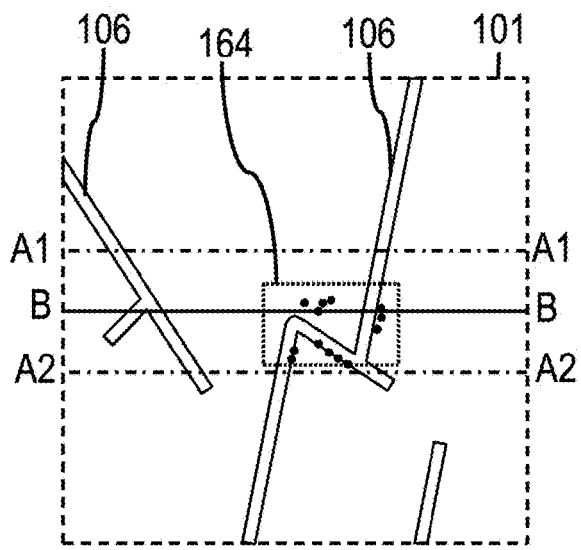
Figure 8C:
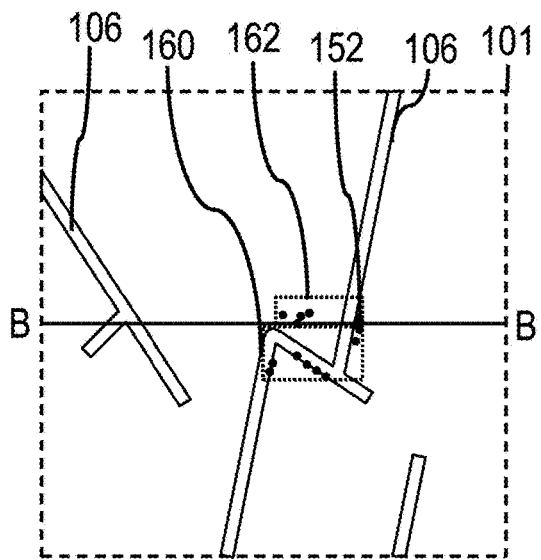
Figure 8D:
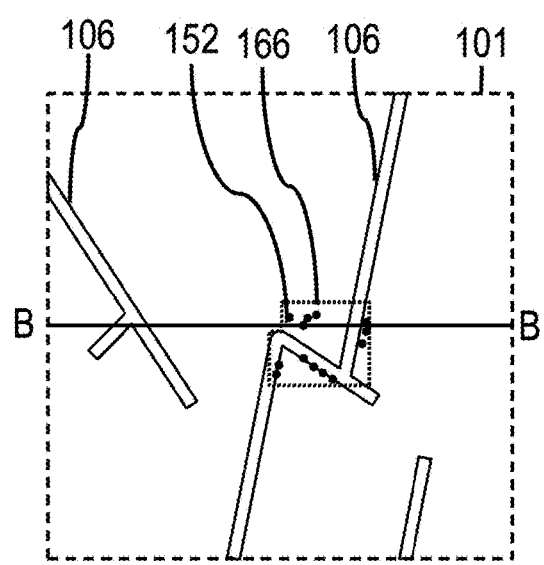

FIGS. 8A-8D depict steps of another embodiment of a method of generating zones including compensating for a division of clusters by a geographical boundary B. As shown in FIG. 8A, the boundary B divides a plurality of vehicle stops 152. Accordingly, where a clustering algorithm is executed separately on the upper geographical space and the lower geographical space, multiple zones may be formed where there should be one zone. Accordingly, in some embodiments as shown in FIG. 8A, a buffer may be established around the boundary B, as shown in FIG. 8A as lines A1 and A2. The buffer may extend a predetermined distance from the boundary (e.g., 100 m, 50 m, etc.). In some embodiments, a method of generating zones may include treatment of the buffer as its own geographical space. That is, in some embodiments, vehicle stops within the buffer may be identified, one or more buffer clusters of stops may be identified using a clustering algorithm, and one or more buffer polygons may be created corresponding to the one or more identified buffer clusters. The results of such a method are shown in FIG. 8B. As shown in FIG. 8B, a buffer polygon 164 has been created based on the identified cluster of stops that straddle the geographical boundary B. FIG. 8C, depicts the results of a method according to FIGS. 7A-B, where a polygon 160 of the lower geographical space and a polygon 162 of the upper geographical space are created based on the separate execution of a clustering algorithm in each geographical space. In some embodiments, a method may include determining whether the buffer polygon and the polygon 160 or the polygon 162 overlap. If the buffer polygon and any of the polygons 160, 162 do overlap, the buffer polygon may be merged with the overlapping polygons 160, 162. Accordingly, as shown in FIG. 8D, the resulting merged polygon 166 encompassed all vehicle stops within the cluster on both sides of the geographical boundary. Thus, the method shown in FIGS. 8A-8D may be employed to ensure zones generated by methods and systems according to exemplary embodiments described herein do not limit appropriate clusters by introduction of geographical boundaries during computation.

Figure 9:
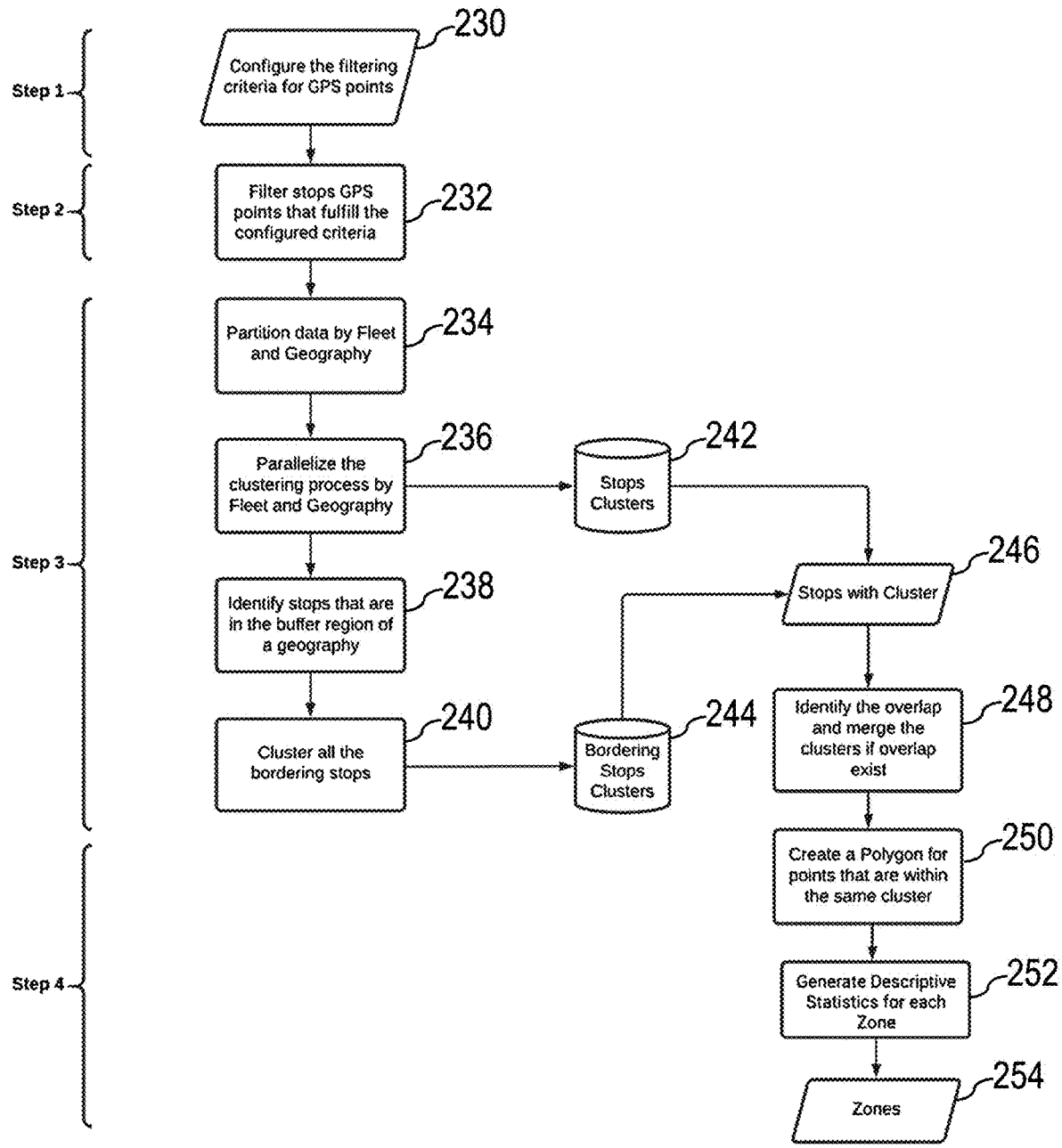
FIG. 9 depicts another embodiment of a method for generating zones.

FIG. 9 depicts another embodiment of a method for generating zones. As an example to illustrate the method of FIG. 9, an exemplary fleet operates 24/7 and comprises 200,000 vehicles, including 100,000 heavy duty trucks (HDTs) 90,000 light duty trucks (LDTs), and 10,000 passenger cars. According to this example, a user wishes to obtain information relating to stops made by the fleet vehicles in the last 6 months. In block 230, a first step includes configuring one or more filter parameters for filtering vehicle data to generate one or more zones. As discussed above, the filter parameters may include one or more parameters which may be input by the user. In the present example, a user may apply a vehicle type filter parameter for the HDTs and LDTs, thereby filtering the stops of the passenger cars. In the present example, a user may apply a time filter to filter stops not made in the last six months. Of course, any suitable filter parameters may be selected, as the present disclosure is not so limited. In block 232, a second step includes selecting vehicle data corresponding to filter configurations of block 230 for identifying vehicle stops based on telematics data. According to the example, 100 million stops may be obtained after block 232.

As shown in FIG. 9, in block 234 a third step of implementing a clustering technique for identifying high density regions of stops begins. In the present example, 100 million stops are to be clustered prior to creating zones. In some cases, such a large number of stops introduces a scaling challenge with respect to applying the same clustering technique to both small fleets and large fleets (e.g., the exemplary fleet). The inventors have appreciated that a limitation of density based clustering algorithms is that such algorithms compute pairwise distances to determine the density. For a smaller fleet, processing time and/or power is not an issue when using such an algorithm for clustering stops. However, applying such an algorithm to a number of stops associated with a large fleet, such as 100 million stops, may present a bottleneck in the zone creation process. However, the inventors have appreciated that by reducing the search space for the spatial clustering algorithm, the challenge may be alleviated and enable the use of the same approach for different fleet sizes. Accordingly, as shown in block 234, prior to implementing a clustering technique for identifying high density regions of stops, the method includes partitioning the stops according to a specified criteria. Once partitioned, in block 236 the method includes clustering each partition of stops in parallel. For example, in some embodiments, stops may be partitioned according to geography. For instance, stops may be partitioned according to administrative or geographical boundaries for governing different regions, e.g., country, state/province, city, division, county, municipality postal code, and/or any other suitable boundary. As another example, in some embodiments, stops may be partitioned by one or more filter parameters, such as vehicle type. For example, a clustering algorithm may be executed on stops associated with heavy duty trucks in parallel with executing a clustering algorithm on stops associated with light duty trucks. In block 242, clusters identified as a result of block 236 may be stored in a storage medium.

As discussed previously, partitioning stops helps to scale the computation intensive clustering process, but it also presents potential challenges related to splitting a zone disposed on an administrative boundary. Accordingly, as shown in FIG. 9, In block 238 stops that are disposed within a buffer region around a geographical boundary are identified. The buffer region may extend a predetermined distance from the geographical boundary. In block 240, one or more clusters of the buffer stops may be identified (e.g., by a clustering algorithm). The identified buffer clusters may be stored in a storage medium as shown in block 244. As shown in FIG. 9, the clusters identified and stored in block 242 and the buffer clusters identified and stored in block 244 are combined in block 246. In block 248, it is determined if any of the combined clusters overlap. In some embodiments, if any clusters overlap, the overlapping clusters are merged. In some embodiments, if any clusters are within a threshold distance from one another, the clusters within the threshold distance of one another are merged. In block 250, a fourth step of the method is creating a polygon for each of the identified clusters following the merging process of block 248. The created polygons may each correspond to a zone.

As shown in FIG. 9, in block 252, descriptive statistics (e.g., vehicle information) may be generated for each polygon created in block 250. The process of block 252 may include processing vehicle data corresponding to provide individual vehicle information or overall fleet statistics within the zone. Some examples of descriptive statistics may include but are not limited to stop count in the filter parameter time period, distinct vehicle count in the filter parameter time period, stop distribution by month, average stop duration, 15th percentile stop duration, 50th percentile stop duration, 85th percentile stop duration, average driving duration before stopping in the zone, and average idling time within the zone. One or more of these metrics may generated for each created zone. In some embodiments, the descriptive statistics may be generated based on input received from a user. In block 254, the zones and descriptive statistics may be output to a user (e.g., on a graphical user interface). An exemplary user interference including a graphical user interface that a user may employ to send input or receive information is described further with reference to FIG. 10.

Figure 10:
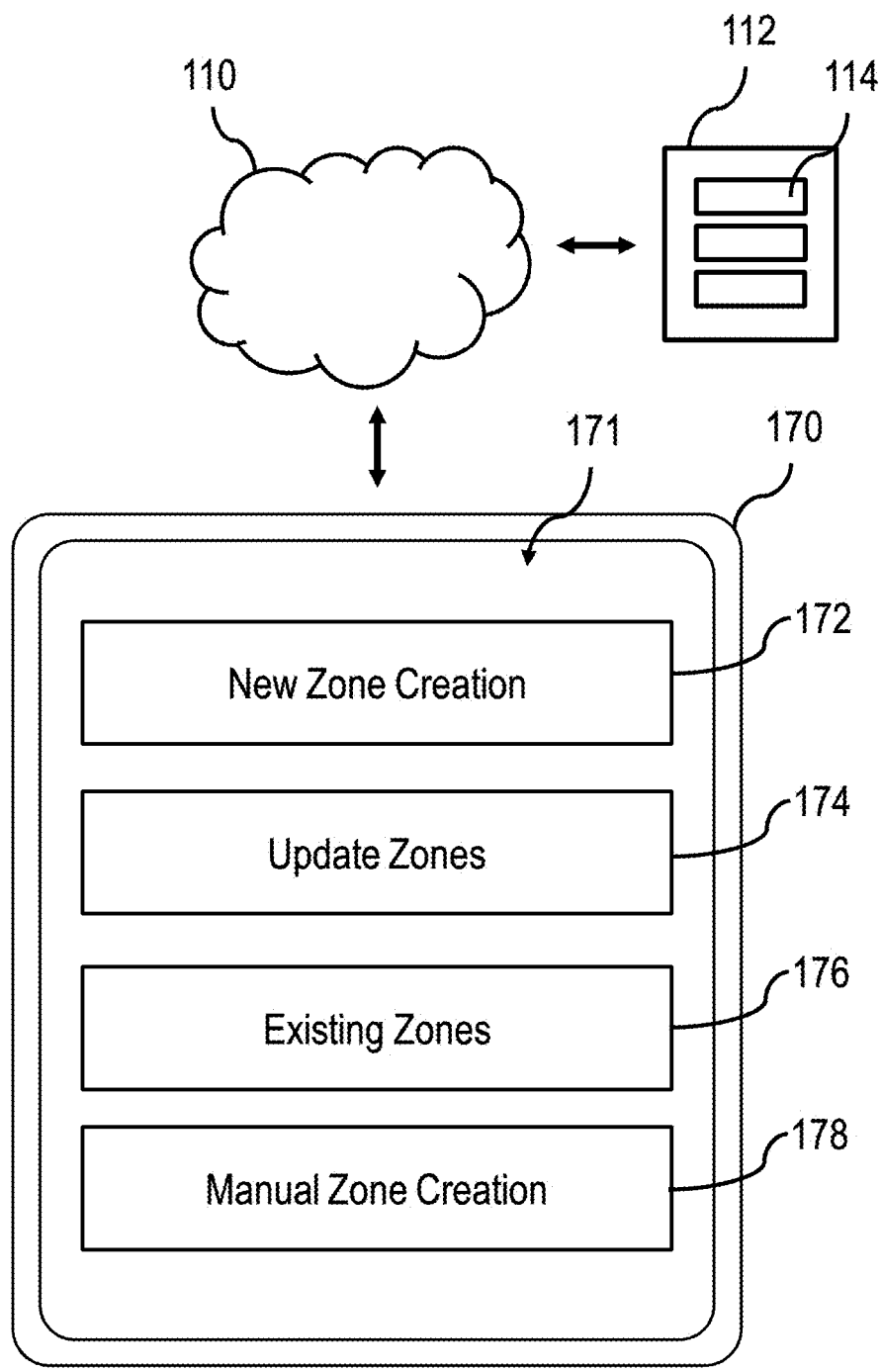
FIG. 10 depicts a schematic of one embodiment of a user interface of a telematics system.

FIG. 10 depicts a schematic of one embodiment of a user interface 170 of a telematics system 100. According to the embodiment of FIG. 10, the user interface 170 is configured as a personal computing device such as a tablet. The user interface is configured to communicate with a remote server 112 via a network 110 using any appropriate wireless or wired protocols. The user interface 170 includes a graphical user interface 171 on a display screen. As shown in FIG. 10, the user interface allows a user to send input to the server 112 and/or receive information from the server 112 (e.g., one or more zones output by the zone generation facility 114). According to the embodiment of FIG. 10, a user may select block 172 to create a new zone according to methods described herein. A user may employ the user interface to select one or more filter parameters, if desired. A user may select block 174 to update existing zones according to exemplary embodiments described herein. A user may select block 176 to view existing zones, including vehicle information associated with those zones. Finally, a user may select block 178 to manually create zones. While a specific user interface arrangement is shown in FIG. 10, a user interface may provide information to or solicit input from a user in any suitable arrangement or order, as the present disclosure is not so limited.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method of generating zones with a telematics system, the method comprising:
    obtaining telematics data from one or more telematics devices associated with one or more vehicles, the telematics data including GPS data associated with one or more trips taken by the one or more vehicles;
    identifying stops in the telematics data;
    identifying a first cluster of stops and a second cluster of stops using a clustering algorithm;
    creating a first polygon containing the first cluster of stops and creating a second polygon containing the second cluster of stops;
    outputting each of the first polygon and the second polygon as a zone to a user;
    determining whether the first polygon and the second polygon overlap;
    determining whether a percentage of overlapping area between the first polygon and the second polygon exceeds a threshold percentage of overlapping area in response to determining that the first polygon and the second polygon overlap;
    based on the determination of whether the percentage of overlapping area between the first polygon and the second polygon exceeds the threshold percentage of overlapping area, merging the first polygon and the second polygon into a merged polygon; and
    outputting the merged polygon as a merged zone to the user.

2. The method of claim 1, further comprising:
    determining whether the first polygon and the second polygon are within a threshold distance of one another;
    based on the determination of whether the first polygon and the second polygon are within a threshold distance of one another, merging the first polygon and the second polygon into the merged polygon; and
    outputting the merged polygon as the merged zone to the user.

3. The method of claim 1, further comprising:
    obtaining vehicle information for the first and second cluster of stops; and
    outputting the vehicle information to the user.

4. The method of claim 3, wherein obtaining the vehicle information includes receiving one or more parameters from the user as a user input, and wherein the vehicle information is based on the one or more parameters.

5. The method of claim 4, wherein the one or more parameters include at least one selected from a group of dwell time, number of entries, number of exits, and vehicle type.

6. The method of claim 1, wherein identifying the stops in the telematics data includes receiving one or more filter parameters from the user as a user input, and wherein the stops are identified based on the one or more filter parameters.

7. The method of claim 6, wherein the one or more filter parameters include at least one selected from a group of vehicle type, time of day, month range, date range, stop time, and geography.

8. The method of claim 1, wherein identifying the first cluster of stops and the second cluster of stops includes assigning at least one geographical space having a geographical boundary for the clustering algorithm.

9. The method of claim 8, wherein the geographical boundary includes at least one selected from a group of a national border, a county border, and a postal code border.

10. The method of claim 8, further comprising:
    establishing a buffer extending a predetermined distance around the geographical boundary;
    identifying stops within the buffer;
    identifying a buffer cluster of stops within the buffer using the clustering algorithm; and
    creating a buffer polygon containing the buffer cluster of stops within the buffer.

11. The method of claim 10, further comprising:
    determining whether the buffer polygon and the first polygon overlap;
    based on the determination of whether the buffer polygon and the first polygon overlap, merging the buffer polygon and the first polygon into a second merged polygon; and
    outputting the second merged polygon as a second merged zone to the user.

12. The method of claim 10, wherein the predetermined distance is between 75 m and 125 m.

13. The method of claim 11, further comprising:
    determining whether a percentage of overlapping area between the first polygon and the buffer polygon exceeds a second threshold percentage of overlapping area;
    based on the determination of whether the percentage of overlapping area between the first polygon and the buffer polygon exceeds the second threshold percentage of overlapping area, merging the first polygon and the buffer polygon into the second merged polygon; and
    outputting the second merged polygon as the second merged zone to the user.

14. The method of claim 1, wherein outputting the merged polygon as a merged zone to the user comprises displaying the merged polygon on a graphical user interface.

15. A telematics system comprising:
    at least one processor; and
    at least one storage medium having encoded thereon executable instructions that, when executed by the at least one processor, cause the at least one processor to carry out a method, wherein the method comprises:

obtaining telematics data from one or more telematics devices associated with one or more vehicles, the telematics data including GPS data associated with one or more trips taken by the one or more vehicles;

identifying stops in the telematics data;

identifying a first cluster of stops and a second cluster of stops using a clustering algorithm;

creating a first polygon containing the first cluster of stops and creating a second polygon containing the second cluster of stops;

outputting each of the first polygon and the second polygon as a zone to a user;

determining whether the first polygon and the second polygon overlap;

determining whether a percentage of overlapping area between the first polygon and the second polygon exceeds a threshold percentage of overlapping area in response to determining that the first polygon and the second polygon overlap;

based on the determination of whether the percentage of overlapping area between the first polygon and the second polygon exceeds the threshold percentage of overlapping area, merging the first polygon and the second polygon into a merged polygon; and outputting the merged polygon as a merged zone to the user.

16. The telematics system of claim 15, the method further comprising:

determining whether the first polygon and the second polygon are within a threshold distance of one another;

based on the determination of whether the first polygon and the second polygon are within a threshold distance of one another, merging the first polygon and the second polygon into the merged polygon; and outputting the merged polygon as the merged zone to the user.

17. The telematics system of claim 15, the method further comprising:

obtaining vehicle information for the first and second cluster of stops; and outputting the vehicle information to the user.

18. The telematics system of claim 17, wherein obtaining the vehicle information includes receiving one or more parameters from the user as a user input, and wherein the vehicle information is based on the one or more parameters.

19. The telematics system of claim 18, wherein the one or more parameters include at least one selected from a group of dwell time, number of entries, number of exits, and vehicle type.

20. The telematics system of claim 15, wherein identifying the stops in the telematics data includes receiving one or more filter parameters from the user as a user input, and wherein the stops are identified based on the one or more filter parameters.

21. The telematics system of claim 20, wherein the one or more filter parameters include at least one selected from a group of vehicle type, time of day, date range, stop time, and geography.

22. The telematics system of claim 15, wherein identifying the first cluster of stops and the second cluster of stops includes assigning at least one geographical space having a geographical boundary for the clustering algorithm.

23. The telematics system of claim 22, wherein the geographical boundary includes at least one selected from a group of a national border, a county border, and a postal code border.

24. The telematics system of claim 22, wherein the method further comprising:

establishing a buffer extending a predetermined distance around the geographical boundary;

identifying stops within the buffer;

identifying a buffer cluster of stops within the buffer using the clustering algorithm; and creating a buffer polygon containing the buffer cluster of stops within the buffer.

25. The telematics system of claim 24, the method further comprising:

determining whether the buffer polygon and the first polygon overlap;

based on the determination of whether the buffer polygon and the first polygon overlap, merging the buffer polygon and the first polygon into a second merged polygon; and outputting the second merged polygon as a second merged zone to the user.

26. The telematics system of claim 24, wherein the predetermined distance is between 75 m and 125 m.

27. The telematics system of claim 25, the method further comprising:

determining whether a percentage of overlapping area between the first polygon and the buffer polygon exceeds a second threshold percentage of overlapping area;

based on the determination of whether the percentage of overlapping area between the first polygon and the buffer polygon exceeds the second threshold percentage of overlapping area, merging the first polygon and the buffer polygon into the second merged polygon; and outputting the second merged polygon as the second merged zone to the user.

28. The telematics system of claim 15, further comprising a graphical user interface, wherein outputting the merged polygon as a merged zone to the user comprises displaying the merged polygon on the graphical user interface.

* * * * *